United States Patent [19]

Bova et al.

[11] Patent Number: 5,314,752
[45] Date of Patent: May 24, 1994

[54] AUTOMOTIVE WEATHERSTRIPPING

[75] Inventors: Angela E. Bova, Woodbury; Donald W. Tredinnick, Ansonia, both of Conn.

[73] Assignee: Uniroyal Chemical Company, Inc., Middlebury, Conn.

[21] Appl. No.: 72,356

[22] Filed: Jun. 3, 1993

Related U.S. Application Data

[63] Continuation of Ser. No. 718,147, Jun. 20, 1991, abandoned.

[51] Int. Cl.$^5$ .............................................. B32B 27/00
[52] U.S. Cl. ............................. 428/424.2; 428/424.7; 428/424.8; 428/425.5; 524/232
[58] Field of Search ................. 524/232; 428/424.2, 428/424.7, 424.8, 425.5

[56] References Cited

U.S. PATENT DOCUMENTS

| | | | |
|---|---|---|---|
| 4,150,010 | 4/1979 | Itoh | 260/37 |
| 4,201,698 | 5/1980 | Itoh | 260/3 |
| 4,720,518 | 1/1988 | Chihara | 524/264 |
| 4,968,469 | 11/1990 | White | 524/232 |

FOREIGN PATENT DOCUMENTS 1-108245  4/1989  Japan ................................. 524/232

OTHER PUBLICATIONS

Unichem International–Product Brochure (Dec. 1986).
Kirk–Othmer Encyclopedia, vol. 2, pp. 255–258 (1986).
Fats and Oils (ed. Kirschenbauer) pp. 8–13 (1960).

Primary Examiner—Joseph L. Schofer
Assistant Examiner—Peter D. Mulcahy
Attorney, Agent, or Firm—Jerome D. Drabiak

[57] ABSTRACT

The invention concerns a silicone-modified EPDM modified with a freeze release additive of a fatty acid amide and/or optionally, graphite having at least 85% carbon, and compounded and co-extruded onto the surface of elastomeric sponge automotive weatherstripping thereby forming a permanent skin surface on the sponge material. The resulting material has improved and desirable freeze-release and coefficient of friction properties. These improved properties eliminate the need for currently used spray coatings, resulting in manufacturing cost savings and more durable surface.

4 Claims, No Drawings

AUTOMOTIVE WEATHERSTRIPPING

This is a continuation of application Ser. No. 07/718,147 filed Jun. 20, 1991 now abandoned.

FIELD OF THE INVENTION

This invention relates to an automotive weatherstripping composition containing an EPDM/Silicone blend modified with an erucamide which can be compounded and co-extruded into the surface of the weatherstrip prior to vulcanization. This blend can be further modified with carbon, especially certain graphites, for increased enhancement of the surface properties.

BACKGROUND OF THE INVENTION

Material used in the channels surrounding automobile glass needs good abrasion resistance to assure proper sealing of the automotive glass to avoid both leaks and freezing around the glass in cold weather.

Automotive weatherstripping for doors and trunk lids ordinarily uses closed-cell extruded EPDM sponge. A typical compound contains an EPDM polymer with high ENB (ethylidene norbornene) to provide a fast cure rate. EPDM (ethylene-propylene-nonconjugated diene terpolymer) is the industry standard for use as weatherstripping, made by the copolymerization of ethylene, propylene and ethylidene norbornene. Advantages in using this formulation include high molecular weight which imparts good green strength for cross-sectional shape retention.

It is customary for automotive weatherstripping to be coated with silicone or urethane spray to impart a low coefficient of friction surface for easy door closure and freeze release. This is to prevent automobile doors and trunk lids from freezing shut at low temperatures.

The silicone/urethane coating procedure has been problematic for weatherstripping manufacturers because of additional handling operations required, additional manufacturing costs, and inconsistent performance of the coating in actual field service.

The weatherstripping material is subject to extreme wear due to rubbing from repeated opening and closing of doors, windows and trunk lids. This abrasion can result in removal of sprayed coatings and ultimate failure of the weatherstripping material.

Since it is necessary to promote freeze release of automotive weatherstripping this invention accomplishes this and bypasses the need for a sprayed coating by allowing the freeze release properties to be obtained by co-curing the EPDM/Silicone/erucamide onto the surface of the weatherstripping.

A further enhancement of the improved properties results from modification of the silicone-modified EPDM/erucamide with carbon, as certain graphites. The experimental data that follows indicates that the addition of these graphites lowers the coefficient of friction to a level below that specified by automotive manufacturers for weatherstripping.

Improvements to the freeze-release and coefficient of friction properties of weatherstripping have been attempted by changing the composition of the weatherstripping itself. An EPDM silicone blend surpasses EPDM sponge with a low coefficient of friction, greater resistance to surface freezing, and excellent weathering resistance. Silicone-modified EPDM may be used in weatherstripping for automotive doors, trunks, and sunroofs and for continuous and molded automotive sponge. However, this material is not routinely used as a material of construction for general purpose automotive weatherstripping. One reason for this is the higher cost of this material as compared to EPDM sponge.

Other materials which have been used for automotive weatherstripping are silicone sponges, which have been used for higher-temperature resistant automotive sunroof seals and related sponge gasketing requiring a similar type of heat resistance. This material is prohibitively expensive for general automotive weatherstripping use.

The instant invention represents a cost savings by (1) imparting the necessary freeze release and coefficient of friction properties to EPDM sponge by co-curing a thin-skin of the high performance silicone-modified EPDM based material of this invention onto the EPDM sponge; and (2) eliminating the need for sprayed urethane or silicone coatings to impart the needed surface properties to the weatherstripping.

A further advantage of the current invention is that since the improved properties are imparted during cure, they will not erode away as will the commonly used sprayed coatings. A still further advantage of cocuring the freeze release agent over post-manufacture spraying is the environmental advantage gained by eliminating the spraying process. The current invention eliminates the need for organic solvents necessary to dissolve the silicone and urethane.

An approach to abrasion resistant coatings for automotive weatherstripping that are not sprayed include that of Chihara et al (in U.S. Pat. No. 4,720,518) wherein amide-functional thermoplastic polymer solutions are halogenated and then blended with silicones, fillers and pigments and coated onto a rubber substrate in the form of a weatherstrip or glass run channel, dried and irradiated with ultraviolet light or heated sufficiently to reform the amide groups and to provide the rubbery substrate with an adherent and abrasion resistant coating with a reduced coefficient of friction.

The current invention employs neither amide-containing resins as nylon nor ultraviolet irradiation described in this invention.

Advantageous performance properties of synthetic rubber compositions are described by Itoh et al in U.S. Pat. Nos. 4,201,698 and 4,150,010. Described therein are synthetic organic rubber and organopolysiloxane capable of co-vulcanization onto an elastomer with improved Properties compared to natural and other synthetic organic rubbers.

SUMMARY OF THE INVENTION

The primary object of this invention is to incorporate the necessary freeze-release properties onto the weatherstripping by cocuring a non-cellular skin composition onto the cellular body, also referred to as an elastomer base layer as described in the following description and examples.

The elastomeric skin is a rubber-like composition having as a base elastomer an EPDM-silicone blend polymer modified by the addition of an amide or graphite. Among the preferred amides would be a fatty acid amide of the formula

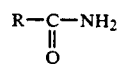

where R may be a saturated or unsaturated carbon chain.

This blend can be further modified with certain graphites, for increased enhancement of the surface properties. Graphite, in many forms and grades, is well-known as has many common uses, such as in pencils, refractory crucibles, stove polish, as a pigment, lubricant, for matches and explosives, anodes, arc-lamp carbons, electroplating, polishing compounds, and the like. The use of certain graphites in the instant invention has surprisingly resulted in the further lowering of the coefficient of friction and freeze release properties.

The polymeric blend of this invention can be compounded by the addition of 0 to 300 phr of reinforcing agents, 0 to 200 phr of processing aids or plasticizers, 0 to 10 phr of antidegradants, 0 to 300 phr of fillers, 0 to 200 phr of extender oils, and the like, all of which additional components are well known to those skilled in the rubber art. 5 to 200 parts of reinforcing siliceous filler may be useful in the composition of the present invention and should preferably have a specific surface area of at least 50 m$^2$/g. Examples of the reinforcing siliceous fillers are precipitated silica, fumed silica, calcium silicate, magnesium silicate, and aluminum silicate. These reinforcing siliceous fillers may be used, if necessary, in combination with other non-reinforcing or non-siliceous fillers, such as carbon black, diatomaceous earth, metal oxides, e.g. titanium dioxide, aluminum oxide and iron oxide, graphite powder, calcium carbonate, and certain organic fillers. They are co-extruded onto the surface of the weatherstrip forming a Permanent skin surface that will have coefficient of friction and release properties similar to urethane and/or silicone spray coatings currently used for this purpose.

DETAILED DESCRIPTION OF THE INVENTION

This invention consists of a composition suited for use as automotive weatherstripping comprising:

a synthetic elastomer blended with an organic silicone compound; and a modification of the blend with an amide. Among the Preferred amides would be a fatty acid amide of the formula

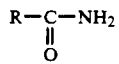

Similar enhancement of the desired freeze-release and coefficient of friction properties result from the addition of carbon in certain forms of graphite. Those graphites which favorably influence the desired properties of the weatherstripping of this invention include those with a percentage of carbon greater than 85%.

The invention is further concerned with a means of cocuring the said synthetic elastomer blended with an organic silicone compound with the amide, and, optionally, carbon in the form of graphite to produce a material cocurable with ordinary weatherstripping to produce the desired freeze release and coefficient of friction properties. The term -cocure- means that the two materials are sufficiently compatible to effect a strong cohesive bond between the two materials under similar curing conditions of temperature and pressure.

The elastomer employed as substrate for the cocured weatherstripping may be one of a number of synthetic elastomers. Typical of the possibilities include NBR, SBR silicone, polychloroprene, EP or EPDM and blends thereof primarily in the form of a cellular sponge.

To be cured with the above mentioned substrate is a second synthetic elastomer preferably those described in U.S. Pat. Nos. 4,201,698 and 4,150,010 incorporated herein by reference. A preferred second synthetic elastomer is: (a) 100 parts of a compatibilized EPDM/organopolysiloxane with a degree of unsaturation ranging from 5-12%, composed of (a-1) from 50 to 95% by weight of natural rubber or an organic synthetic rubber and (a-2) from 50 to 5% weight of an organopolysiloxane expressed by the average unit formula (I)

where R is a substituted or unsubstituted monovalent hydrocarbon group and a is a number from 1.90 to 2.05 inclusive, and having in the molecule at least two functional units selected from the class consisting of aliphatically unsaturated linkages and mercapto groups. Also, optionally present is: (b) from 0.1 to 20 parts by weight of an organosilicon compound having in the molecule at least one polysulfide linkage and at least one hydroxy group directly bonded to the silicon atom or atoms and/or hydrolyzable atom or groups; (c) from 5 to 200 parts by weight of a reinforcing siliceous filler having a specific surface area of at least 50 m$^2$/g. and (d) from 0.1 to 10 parts by weight of a curing agent.

As the component (a-1), various kinds of known organic synthetic rubbers may be used, their examples being isoprene rubbers, styrene-butadiene rubbers, butadiene rubbers, butyl rubbers, butadiene- acrylonitrile rubbers, ethylene-propylene-diene terpolymer rubbers, ethylene-propylene rubbers, ethylene-vinyl acetate copolymer rubbers, chlorinated polyethylene rubbers, acrylic rubbers, chloroprene rubbers, urethane rubbers, polysulfide rubbers, chlorosulfonated polyethylene rubbers, epichlorohydrin rubbers, isobutylene-isoprene rubbers, and the like. Preferred among the organic rubbers from the standpoint of easiness in co-vulcanization are those which do not contain halogen atoms or, in particular, dienic rubbers, such as EPDM, styrene-butadiene rubbers, ethylene vinyl acetate copolymer rubbers, and isobutylene-isoprene rubbers.

The organopolysiloxane as the component (a-2) in the composition of the present invention is expressed by the average unit formula (I) above, and necessarily has at least two functional units selected from aliphatically unsaturated linkages and mercapto groups (-SH) per molecule. The symbol R in the formula represents a substituted or unsubstituted monovalent hydrocarbon group exemplified by alkyl groups, such as methyl, ethyl, propyl, and butyl groups; aryl groups, such as phenyl and tolyl groups; and those groups obtained by replacing part of the hydrogen atoms in the above-named hydrocarbons groups with certain substituents, such as halogen atoms or cyano groups.

The above-mentioned aliphatically unsaturated linkages are involved in the molecules of the organopolysiloxane in the form of vinyl, allyl, cyclopentadienyl, 3-methacryloxypropyl groups and the like. The mercapto groups also mentioned above are usually bonded to the silicon atoms through divalent organic groups, such as alkylene existent, for example, in the groups HSCH2-, HSCH2CH2-, OR HSCH2CH2CH2- where the mercapto groups are bonded to the silicon atoms through a linear-chained organic group and in the group

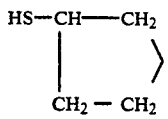

where the mercapto group is bonded to the carbon atom in a divalent hydrocarbon group of the heterocyclic structure formed with the silicon atom.

One of the preferred embodiments is a synthetic elastomer sold under the trademark Royaltherm-650P-LF (Uniroyal Chemical Company).

The other compound used in the co-cure formulation can be a fatty acid amide of the formula

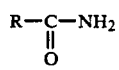

where R may be a saturated or unsaturated carbon chain. The amides may be derived from, for example, oleic, hardened tallow and erucic fatty acids. The R carbon chain can range from 12 to 50 atoms in length and can be unsaturated to the extent from 1 to 4 double bonds. A more preferred fatty acid amide would have 12 to 36 carbon atoms and from 1 to 3 double bonds.

Typical of the more preferred fatty acid amide would be a compound containing from 18 to 25 carbon atoms and 1 to 3 double bonds in the R moiety.

More specifically, a typical example of the most preferred fatty acid amide is a 21 atom carbon chain with one unsaturation, which can be pictured as

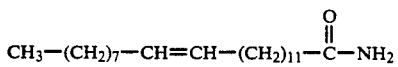

commonly known as 13-docosenamide or erucamide.

The amount of amide used ranged from 1.25 to 20 parts per hundred, with 2 to 10 parts per hundred more preferred and 1 to 8 the most preferred level per hundred rubber compound.

The graphite used can be any of a number of commercially available graphites readily available from a number of commercial manufacturers. Included among these are carbon A-99 and 4014, available from the Asbury Graphite Mills, Inc, Asbury, N.J. These grades of graphite have a carbon content over 85%, as compared with less satisfactory graphites in the following Examples. A more preferred carbon content for the graphite used would be 95+%.

The materials mentioned above were formulated and cocured as illustrated by the following examples. These examples are intended to further illustrate the invention and are not intended to limit the scope of the invention in any manner whatsoever.

EXAMPLES

Employing the ingredients indicated in Table 1 (which are listed in parts per hundred of rubber by weight) several rubber compositions were compounded in the following manner:

EPDM (Royalene 2914, trademark of the Uniroyal Chemical Company) silicone base (UR-101, a proprietary product of Shin-Etsu Company) and amide (Unislip 1753, trademark of the Unichema Chemicals, Inc) were charged in a Banbury 1A mixer at #2 speed with water off until the temperature reached 260° F. at which time the mixing was stopped and the batch dropped.

Table 1 represents 3 typical formulations used in those formulations containing solely the above listed components:

TABLE 1

|  | MB-1 | MB-2 | MB-3 |
|---|---|---|---|
| EPDM | 87.20 | 87.20 | 87.20 |
| SILICONE | 50.00 | 50.00 | 50.00 |
| AMIDE | 5.00 | 2.50 | 1.25 |
| TOTAL | 142.20 | 139.70 | 138.45 |

The following ingredients were likewise compounded containing a varying amount of graphite along with Royaltherm 650 (R); Unislip 1753(R), and a varying amount of graphite #4014:

TABLE 1A

|  | A | B | C | D | E | F | G | H |
|---|---|---|---|---|---|---|---|---|
| ROYALTHERM 650 | 275.00 | 275.00 | 275.00 | 275.00 | 275.00 | 275.00 | 275.00 | 275.00 |
| UNISLIP 1753 | 10.00 | 10.00 | 10.00 | 10.00 | 0.00 | 10.00 | 10.00 | 10.00 |
| GRAPHITE #4014[1] | 20.00 | 30.00 | 40.00 | 0.00 | 30.00 | 60.00 | 80.00 | 100.00 |
| TOTAL | 305.00 | 315.00 | 325.00 | 285.00 | 305.00 | 345.00 | 365.00 | 385.00 |

[1]Graphite #4014 is a product of Asbury Graphite Mills

The mixture of Tables 1 and 1A are then compounded with the ingredients listed in Table 2, which are also listed in parts per hundred. All the ingredients were charged in a Banbury 1A mixer at #2 speed with water on until the temperature reached 275° F. at which time the mixing was stopped and the batch dropped.

The following is an example of the compounding ingredients employed in the series:

TABLE 2

|  | MB1A | 1A-A* |
|---|---|---|
| MB 1 | 284.40 | — |
| BATCH A (with graphite) | — | 305.00 |
| ZINC Oxide | 5.00 | 5.00 |
| N-550 C. BLACK | 25.00 | 25.00 |
| N-397 C. BLACK | 125.00 | — |
| N-660 C. BLACK | — | 125.00 |
| CaO DESSICANT[1] | 12.00 | 12.00 |
| ZINC STEARATE | 1.50 | 1.50 |
| PARAFINIC PLASTICIZER[2] | 60.00 | 60.00 |
| TOTAL JOB | 512.90 | 533.50 |

[1]RHENOSORB C (trademark of Rhein-Chemie GmbH)
[2]SUNPAR 2280 (trademark of the Sun Oil Co.)
*The abbreviation 1A-A represents the compound labeled A in TABLE 1A, and is a representative sample of the composition containing silicon-modified EPDM, amide, and graphite.

The curative ingredients, shown by example in Table 3, were charged to a 1A Banbury at #1 speed, water on. One-half the master batch was added, all ingredients, and then the second half was added. At 170° F. the batch was dropped and the physical properties shown in Table 4, were evaluated.

TABLE 3

|  | MB1A | 1A-A |
| --- | --- | --- |
| MB 1A | 512.90 | — |
| Batch A (with graphite) | — | 533.50 |
| MERCAPTOBENZO THIAZOLE ACCEL. | 1.50 | 1.50 |
| [3]TETRAMETHYL THIURAM DISULFSIDE ACCEL | 0.80 | 0.80 |
| [4]ZINC DIBUTYL DITHIOCARBAMATE ACCEL | 2.00 | 2.00 |
| [5]75% ETHYLENE THIOUREA ACCEL | 1.50 | 1.50 |
| DIPHENYL GUANIDINE ACCELERATOR | 0.50 | 0.50 |
| SULFUR | 1.50 | 1.50 |
| TOTAL | 520.70 | 541.30 |

[3]TUEX ™ (trademark, Uniroyal Chemical Co.)
[4]BUTAZATE ™ (trademark, Uniroyal Chemical Co.)
[5]END 75 ™ (trademark, Rhein Chemie GmbH)

When formulations of the type herein labeled MB-1, are compounded and cocured onto automotive weatherstripping the principal properties found are summarized in the Table 4, along with comparative results for other weatherstripping materials.

The compositions are cocured onto automotive weatherstripping by one of any number of continuous cure Processes. Among these continuous cure processes are hot air, microwave, LCM (salt bath), and fluidized bed. The choice of cure method is left to the preference of the compounder, and is well-known to those skilled in the art.

TABLE 4

| WEATHERSTRIP MATERIAL: AUTOMOTIVE EPDM DUAL DUROMETER SPONGE | FREEZE RELEASE[6] AUG TEST RESULTS: SPECIFIED BY: FBMS 4-1 PROPOSED SPEC: 10 N MAX | COEFFICIENT OF FRICTION[7] AUG TEST RESULTS: SPECIFIED BY: ASTM D1894 GM 9891D (PROPOSED) PROPOSED SPEC: 1.0 MAX |
| --- | --- | --- |
| UNCOATED | 32.0 | 4.75 |
| URETHANE COATED | 10.0 | 0.70 |
| SILICONE COATED | 12.0 | 0.80 |
| ROYALTHERM ™ 650 SPONGE | 10.0 | 1.50 |
| ROYALTHERM ™ 650/ ERUCAMIDE (MB-1) | 8.0 | 1.10 |

The above data indicates that the desirable freeze-release and improved coefficient of friction characteristics are exhibited by the cocured weatherstrip described by this invention. It is noted that this composition possesses the freeze release properties within the accepted specifications. Explanations of footnotes 6 and 7:

Footnote 6

Description of the Fisher Body Freeze Release Test, used for evaluating the potential of weatherstripping to freeze to exterior painted surfaces. The specification is part of Fisher Body Materials Specification. The proposed value of 10 Newtons Max is from General Motors blueprints. A section of the weatherstrip is mounted on a channel simulating its position on a car body. The assembly is then placed in a freezer for 2 hours at −30° C. At the end of 2 hours, the assembly is removed from the freezer. 50 ML. of water is then poured over the top of the weatherstrip and the assembly is then placed back in the freezer for an additional 2 hours at −30° C. At the end of the 2 hours, the assembly is removed from the freezer and the amount of pull required to separate the weatherstrip from the channel is determined and recorded in Newtons.

Footnote 7

Coefficient of Friction Test Method, adapted from ASTM Method D-1894, is used to measure the coefficient of friction of weatherstrip against glass. A piece of weatherstrip 50 mm in length is mounted in a holding fixture. Mount the glass on the plane of the friction tester. Attach the end of the weatherstrip holding fixture to the spring scale and rest the other end with the weatherstrip on the glass. Adjust the height of the spring scale so that the weatherstrip holding fixture is parallel to the glass plate. Place 150 grams on the holding fixture directly over the weatherstrip. Start the tester. The plane under the test specimen should move at a rate of 300 mm/min. Take an average reading over a run of 130 mm. Run a minimum of 5 samples and average the readings. Calculate the coefficient of friction using the formula $$\text{coefficient of friction} = \frac{\text{grams pull}}{\text{weight of fixture}}.$$

It is noted that the coefficient of friction values of the silicone-modified EPDM/erucamide compounds are greatly improved, however it may be desirable to have values below 1.00 even if certain physical properties are diminished. Further investigation and exploration of possible solutions to this led to the use of graphite. As the following data attests, the unexpected improvement in coefficient of friction properties resulted from this further modification.

The data in the following table is derived from the method of Footnote 7 above, except for a change in the sample mounting procedure where the weatherstrip sponge bulb containing the Royaltherm skin surface was cut from the weatherstrip base and wrapped around the cylindrical end of the holding fixture. This change has been incorporated into the finalized specification.

TABLE 5

| Sample | Coefficient of Friction |
| --- | --- |
| A | 1.84 |
| B | 1.76 |
| C | 1.58 |
| D | 1.82 |
| E | 1.68 |
| F | 1.35 |
| G | 1.19 |
| H | 1.06 |

The data in Table 4 and 5 further demonstrate that the compositions of this invention impart the desirable and necessary freeze release and coefficient of friction properties to automotive weatherstripping. The data further indicates that the compositions of this invention uniquely solve a long standing industry-wide problem. The table that follows presents the comparisons of several types of graphites used in these formulations. The characteristics of the grades of graphite, contrasted with the coefficient of friction results when compounded with Unislip 1753 as described above, are presented.

TABLE 6

| Grade No. | % Carbon | Coefficient of Friction |
| --- | --- | --- |
| 508-P | 83.25 | 1.06 |
| A-99 | 99.40 | 0.75 |
| 4014 | 97.00 | 1.00 |

Note for Table 6: The grades of graphite are supplied by Asbury Graphite Mills, Asbury, N.J.

In view of the many changes and modifications that may be made without departing from principles underlying the invention, reference should be made to the appended claims for an understanding of the scope of the protection afforded the invention.

What is claimed is:

1. A weatherstripping material comprising a cocured bilayer of (a) a curable elastomer base layer in adherent contact with (b) a curable elastomer freeze release layer containing an organopolysiloxane and a freeze release additive comprising a fatty acid amide of the formula $$R-\underset{\underset{O}{\|}}{C}-NH_2$$

wherein R has from 12 to 50 carbon atoms and from 0 to 4 carbon-to-carbon double bonds.

2. The weatherstripping material of claim 1 wherein the elastomer of base layer (a) is cellular and the elastomer of freeze release layer (b) is noncellular.

3. The weatherstripping material of claim 1 wherein the elastomer of base layer (a) is selected from the group consisting of NBR, SBR, silicone, polychloroprene, EP or EPDM and blends thereof and the elastomer of freeze release layer (b) is selected from the group consisting of isoprene rubbers, sytrene-butadiene rubbers, butadiene rubbers, butyl rubbers, butadiene-acrylonitrile rubbers, ethylene-propylene-diene terpolymer rubbers, ethylene-propylene rubbers, ethylene-vinyl acetate copolymer rubbers, chlorinated polyethylene rubbers, acrylic rubbers, chloroprene rubbers, urethane rubbers, polysulfide rubbers, chlorosuylfonated polyethylene rubbers, epichlorohydrine rubbers and isobutylene-isoprene rubbers.

4. The weatherstripping material of claim 1 wherein the organopolysiloxane possesses the general formula $R_aSiO_{(4-a/2)}$ wherein R is a substituted or unsubstituted monovalent hydrocarbon group and a is a number from 1.90 to 2.05 inclusive, and having in the molecule at least two functional units selected from the class consisting of aliphatically unsaturated linkages and mercapto groups.

* * * * *